United States Patent
Raines, Jr. et al.

(10) Patent No.: US 6,539,966 B2
(45) Date of Patent: Apr. 1, 2003

(54) REMOVABLE COVER FOR HUNTING BLIND

(76) Inventors: Leon L. Raines, Jr., 711 St. Louis St., Mobile, AL (US) 36602; Mike Ward, 961 N. Beltline Hwy., Mobile, AL (US) 36618

(*) Notice: Subject to any disclaimer, the term of this patent is extended or adjusted under 35 U.S.C. 154(b) by 0 days.

(21) Appl. No.: 09/739,603

(22) Filed: Dec. 19, 2000

(65) Prior Publication Data

US 2002/0074030 A1 Jun. 20, 2002

(51) Int. Cl.[7] .............................. F04H 15/02; F04G 1/26
(52) U.S. Cl. .................... 135/901; 135/96; 135/909; 135/161; 135/158; 43/1; 182/179.1; 403/403
(58) Field of Search ............................ 135/909, 902, 135/117, 161, 88.15, 901, 96, 90, 95, 143, 158, 156; 182/179.1, 187, 186.4; 108/151, 156; 43/1; 52/74; 5/97; 403/403, 401, 382, 169, 170

(56) References Cited

U.S. PATENT DOCUMENTS

| | | | | |
|---|---|---|---|---|
| 2,820,468 A | * | 1/1958 | Park et al. ................. | 135/96 X |
| 2,854,705 A | * | 10/1958 | McClaran et al. ...... | 135/901 X |
| 2,890,498 A | * | 6/1959 | Bigelow ..................... | 135/143 |
| 2,967,534 A | * | 1/1961 | Silye .......................... | 135/143 |
| 3,052,251 A | * | 9/1962 | De Jean, Jr. ................ | 135/96 |
| 3,289,787 A | * | 12/1966 | McSwain ................... | 182/179 |
| 4,606,142 A | * | 8/1986 | Reneau ........................... | 43/1 |
| 5,327,993 A | * | 7/1994 | Stark, Sr. .................... | 182/179 |
| D366,978 S | * | 2/1996 | Mariol ........................ | D6/491 |
| 6,053,190 A | * | 4/2000 | Brown, Jr. et al. ........... | 135/90 |

FOREIGN PATENT DOCUMENTS

DE          4004535 C1  *  7/1991 ....................... 5/97

* cited by examiner

*Primary Examiner*—Lanna Mai
*Assistant Examiner*—Winnie Yip
(74) *Attorney, Agent, or Firm*—George L. Williamson

(57) ABSTRACT

The present invention discloses a cover for a hunting stand which can be removably attached to an existing hunting stand. The present invention is adaptable to fit many sizes and shapes of existing hunting stands; however, one of the common types that it is adaptable to fit is referred to as a tripod hunting stand which comprises an upper hunting stand mounted on a tripod set of legs. The present invention comprises a framework having means for attachment to the railing of the exising hunting stand. The present invention also has a canvas cover mounted thereon which cover has multiple windows provided therein.

15 Claims, 6 Drawing Sheets

REMOVABLE COVER FOR HUNTING BLIND

BACKGROUND OF THE INVENTION

1. Field of the Invention

The present invention generally relates to hunting blinds and, more particularly, is concerned with a method for adapting a hunting blind cover to fit onto an existing hunting blind.

2. Description of the Prior Art

Hunting blinds have been described in the prior art. However, none of the prior art devices disclose the unique features of the present.

In U.S. Pat. No. 2,511,452, dated Jun. 13, 1950, Anderson, et al., disclosed a hunting blind shown as comprising a framework or supporting structure, a seat, and a covering preferably of a fabric material such as canvas which is so secured to and supported on the framework as to define a substantially complete enclosure therewith. More specifically, the structure is preferably formed of tubular members and includes corner posts to the ends of which are secured rail defining upper and lower horizontal frames.

In U.S. Pat. No. 4,777,755, dated Oct. 18, 1988, Colburn disclosed a hunting blind comprising an upper frame including a peripheral frame structure, top reinforcing side members and a cross strut; gun-support bars attached to and vertically spaced from said upper frame; a bottom frame structure separably attached to said upper frame; a cover extending about said upper frame and said lower frame, said cover having a plurality of window openings, and a flap on the inside and a flap on the outside of said window openings to open or close said openings at the discretion of a hunter occupying said blind.

In U.S. Pat. No. 2,854,705, dated Oct. 7, 1958, McClaran disclosed a portable hunting blind comprising a plurality of elongated upright legs arranged in a generally rectangular relationship and sloping inwardly slightly, a horizontal floor panel detachably secured to the upper ends of said legs, X-bracing extending between adjacent legs on each side of said blind, a unitary side wall panel detachable secured to each of the side edges of, said floor panel and extending upwardly therefrom, means detachably securing the abutting edges of each of said side wall panels together, a unitary roof panel resting on the upper edges of said side wall panels and detachably secured thereto, a sliding window arranged for horizontal movement in each of said side wall panels adjacent one side edge thereof, and a trap door formed in said horizontal floor panel for access to, said hunting bad.

In U.S. Pat. No. 5,010,909, dated Apr. 30, 1991, Cleveland disclosed a knock-down three dimensional rectangular frame which is provided as well as an upstanding flexible material sleeve downwardly telescopingly engageable over the frame. The lower end of the sleeve is peripherally openable and removably closable and the upper and lower ends of sleeve include inwardly directed marginal flaps extending fully peripherally thereabout disposable over and under, respectively, the upper and lower ends of the skeletal frame. The sleeve is constructed of a material which may have a camouflaged design on its outer surface and which is preferably substantially air impervious.

In U.S. Pat. No. 6,053,190, dated Apr. 25, 2000, Brown, Jr., et al., disclosed a two-person tree stand system for deer hunting, comprising a housing frame having a horizontal floor formed of peripheral rods in a rectangular access space. The housing also has a roof formed of peripheral rods in a generally rectangular configuration. A central rod with diagonal support rods forms an A-frame. The housing also has sides formed of vertical rods coupling the floor and roof with diagonal support rods. A wooden floor is positioned on the floor of the frame with an opening over the access space. The wooden floor further has a cross-strengthening brace with protruding ends receivable within recesses in the frame. A fabric roof is positionable over the roof of the frame. Four side walls are positionable over the sides of the frame.

While these hunting stands may be suitable for the purposes for which they were designed, they would not be as suitable for the purposes of the present invention, as hereinafter described.

SUMMARY OF THE INVENTION

The present invention discloses a cover for a hunting stand which can be removably attached to an existing hunting stand. The present invention is adaptable to fit many sizes and shapes of existing hunting stands; however, one of the common types that it is adaptable to fit is referred to as a tripod hunting stand which comprises an upper hunting stand mounted on a tripod set of legs. The present invention comprises a framework having means for attachment to the railing of the existing hunting stand. The present invention also has a canvas cover mounted thereon which cover has multiple windows provided therein.

An object of the present invention is to provide a hunting stand cover adaptable to be attached to existing hunting stands. Another object of the present invention is to provide a hunting stand cover which is adaptable to many different existing hunting stands. A further objective of the present invention is to provide a hunting stand cover which can be easily and inexpensively manufactured so as to be adaptable to an existing hunting stand.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
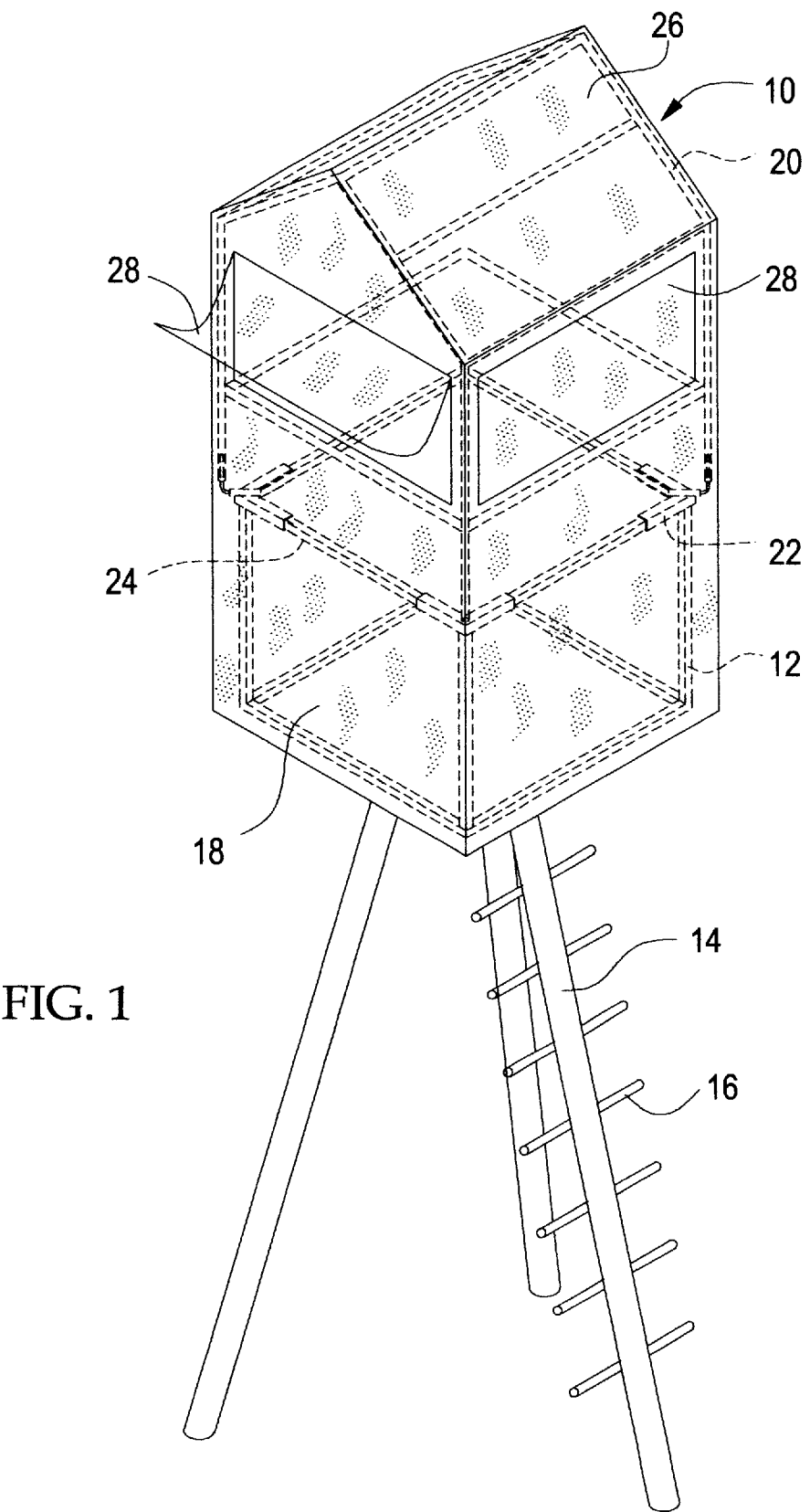
FIG. 1 is a perspective view of the present invention shown in operative connection with an existing hunting stand.

With regard to reference numerals used, the following numbering is used throughout the drawings.

10 present invention
12 existing hunting stand
14 tripod leg
16 ladder rung
18 floor
20 tubular frame
22 means for attachment
24 upper handrail
26 fabric cover
28 window
30 leg member
32 horizontal member
34 roof member
36 means for attachment
38 fastener means
40 door
42 connecting means
44 tubular member
46 weld
48 threaded screw
50 underside face
52 outer face
54 upper face
56 inner flange
58 top angular flange
60 threaded aperture
62 threaded end
64 telescoping rod
66 telescoping rod adjustment
68 horizontal rod
70 female member of telescoping rod
72 hook and loop attachment
74 end piece
76 eyelet
78 sleeve

DESCRIPTION OF THE PREFERRED EMBODIMENT(S)

In order that the invention may be more fully understood, it will now be described, by way of example, with reference to the accompanying drawings in which FIGS. 1 through 7 illustrate the present invention wherein a hunting stand cover is disclosed for attachment to an existing hunting stand.

Turning to FIG. 1, therein is shown a perspective view of the present invention 10 in operative connection with an elevated hunting stand 12 being supported by tripod legs 14 having multiple ladder rung pieces 16 thereon whereby one can climb up the ladder and enter into the elevated hunting stand 12 through some type of opening means (not shown) which is provided in the floor 18 of the elevated hunting stand 12. The present invention 10 comprises a tubular frame 20 having a plurality of means for attachment 22 to the upper rail member 24 of the existing hunting stand 12. Also shown is a fabric cover 26 for placement over the tubular frame 20 which cover has multiple windows 28 provided therein.

Figure 2:
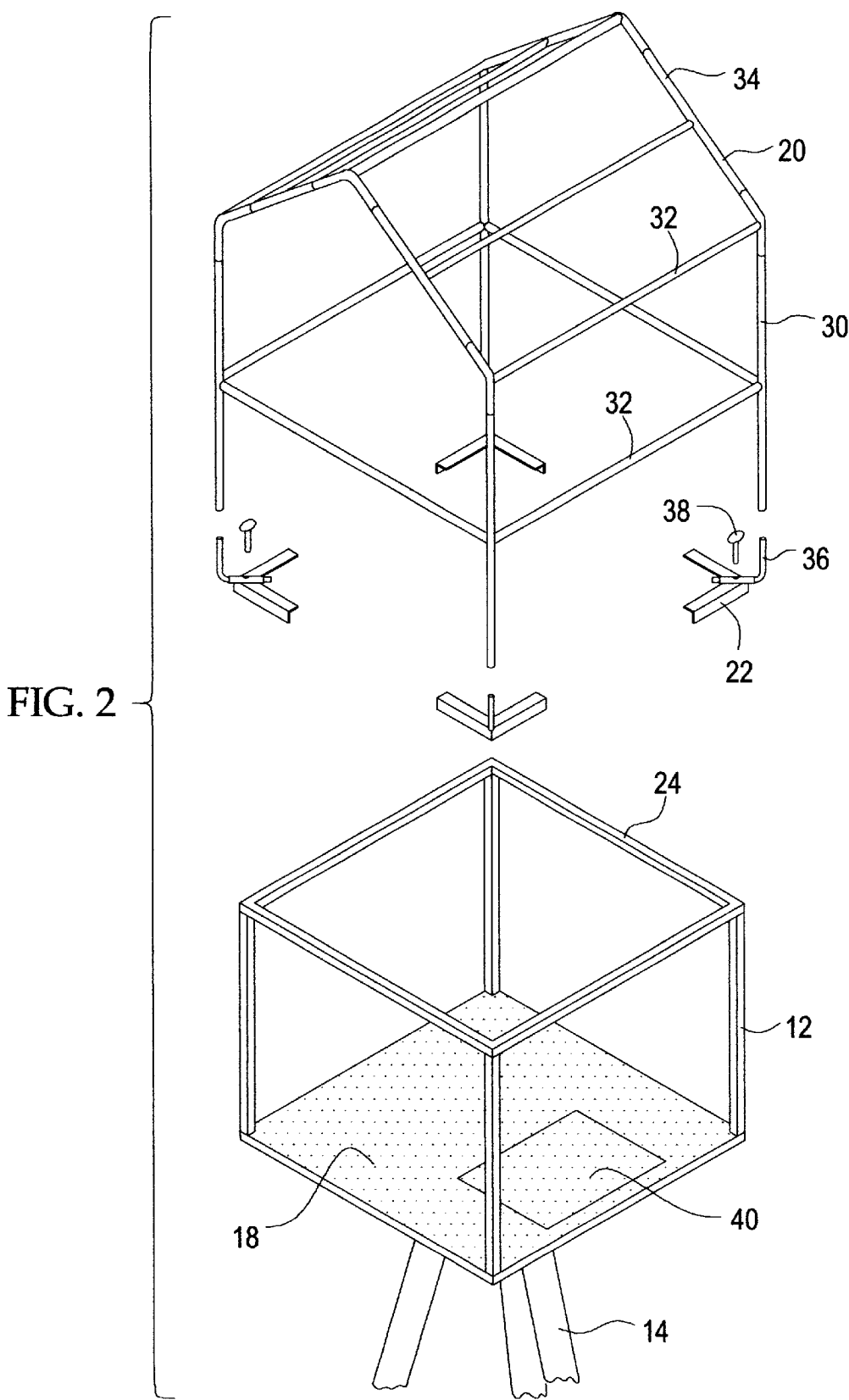
FIG. 2 is an exploded view of the present invention showing its main parts.

Turning to FIG. 2, therein is shown the tubular frame 20 which is comprised of four generally upright leg members 30, multiple cross members 32 and roof frame members 34. As can be seen, the multiple means for attachment 22 for attachment to the multiple corners of the existing hunting stand 12 are shown being elbow-shaped angle iron members having L-shaped rod-like means having an first, upright end and a second end providing a means for attachment 36 having threaded fasteners 38 or the like for attachment to the means for attachment 22. Also shown is the existing hunting stand 12 having handrails 24 thereon along with the floor 18 having an entry means or door 40 therein and the tripod legs 14.

Figure 3:
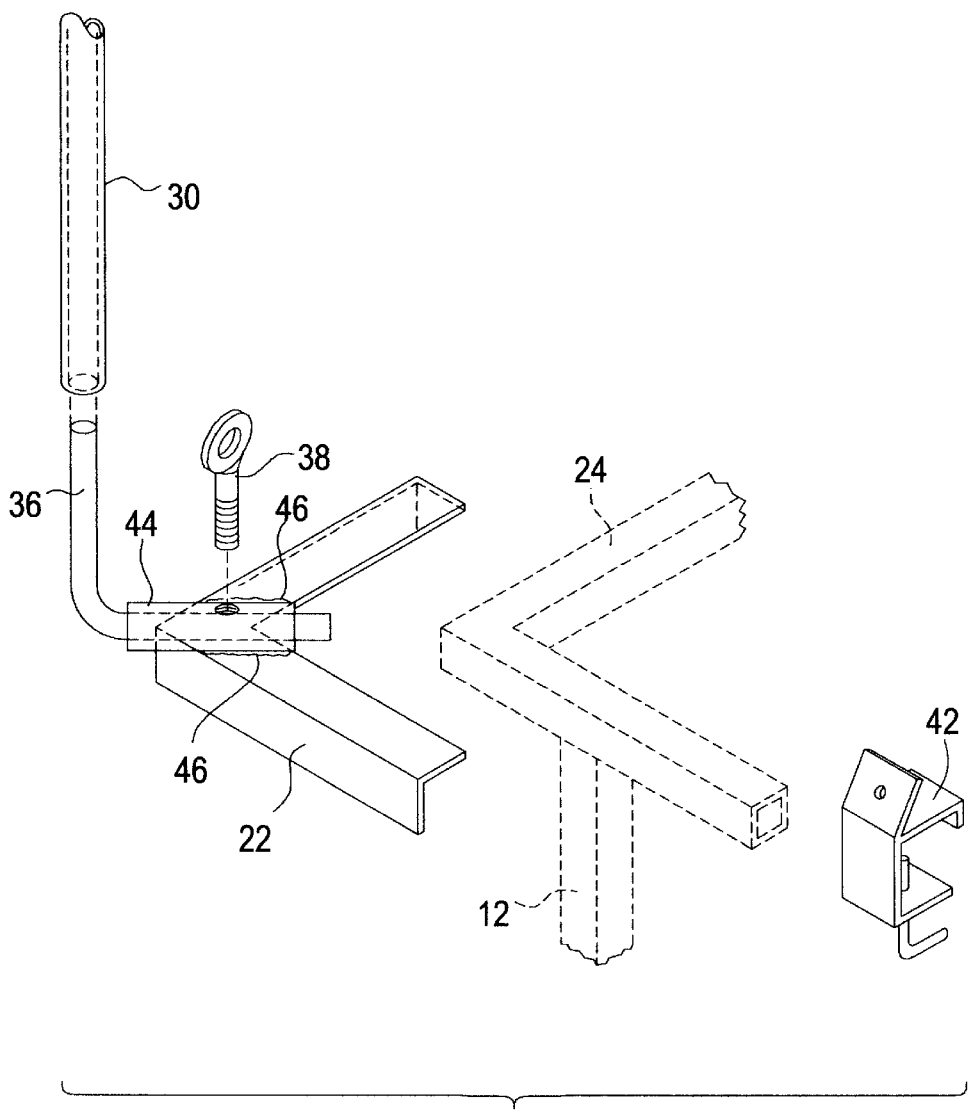
FIG. 3 is an enlarged view of portions of the present invention.

Turning to FIG. 3, therein is shown the existing hunting stand 12 along with its handrail 24 to which the elbow-shaped means for attachment 22 is to be attached by a connecting means 42. Also shown is a tubular leg member 30 of the tubular frame of the present invention for slidably receiving internally therein a second L-shaped rod-like means for attachment 36 which also slides into a tubular-shaped means 44 having a through bore having a threaded aperture 46 therein for receiving the threaded fastening means 38 for threadably mating thereto. Tubular means 44 is fixedly attached by welding or the like at 46. As can be seen, the first means for attachment 22 being elbow-shaped angle iron fits onto one of the multiple four corners of the existing hunting stand 12 and is secured contiguously to the handrail 24 of the hunting stand by clamp-like connecting means 42 which means 42 sandwiches means for attachment 22 between the hand rail 24. The tubular frame 20 of the present invention is then placed slidingly over the L-shaped second means for attachment 36 which is connected to the elbow-shaped means for attachment 22 by the tubular member 44 and fixedly connected thereto by fastening means 38. This procedure is followed for all four corners of the existing hunting stand 12. Rod-like member 36 is slidable in the through bore of member 44 so that it can be adapted to fit onto various sizes of hunting stands 12.

Figure 4:
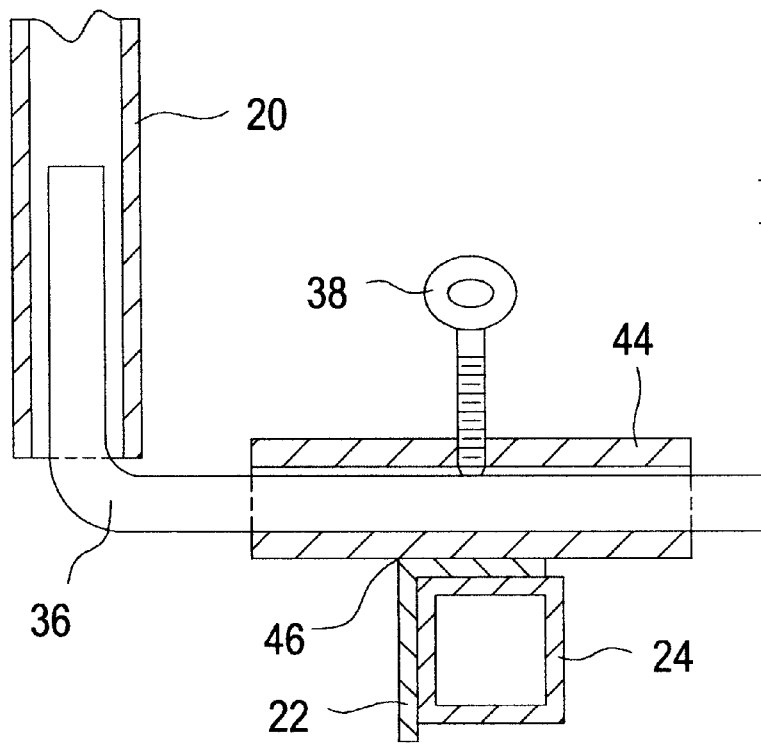
FIG. 4 is a cross-section view of portions of the present invention.

Turning to FIG. 4, therein is shown the tubular frame 20 along with the L-shaped means for attachment 36 which passes through tubular member 44 and is connected thereto with fastening means 38 which is threadedly connected to tubular member 44. Tubular member 44 is connected by welding 46 to the elbow-shaped angle iron member 22 which is then placed in connection contiguously with the tubular member 24 of the existing hunting stand.

Figure 5:
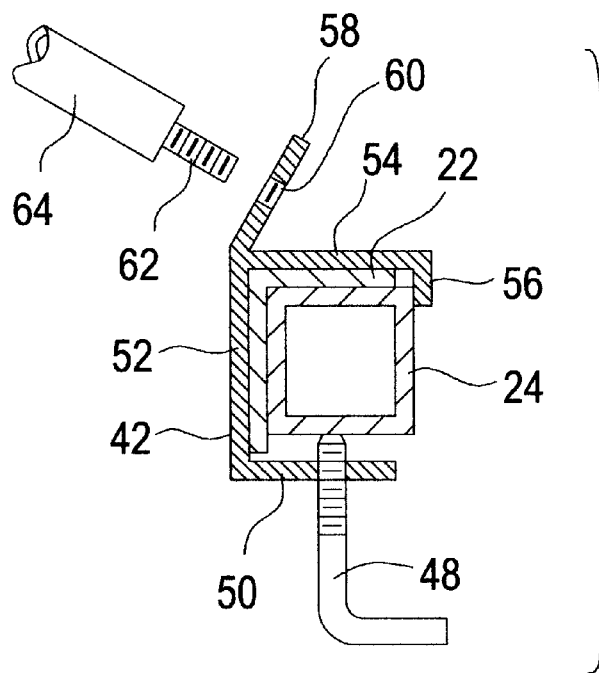
FIG. 5 is a cross-section view of portions of the present invention.

Turning to FIG. 5, therein is shown a cross-section of connecting means 42 which holds the elbow-shaped means for attachment 22 to the handrail 24 of the existing hunting stand. Connecting means 42 is held in place onto handrail 24 by means of a threaded screw 48 on its underside flange member 50. Connecting means 42 also has an outward face 52 an upper side flange face 54, an inner side flange 56, and an upper angular flange 58 having a threaded aperture 60 therein for receiving the threaded tip 62 of telescoping window support rods 64.

Figure 6:
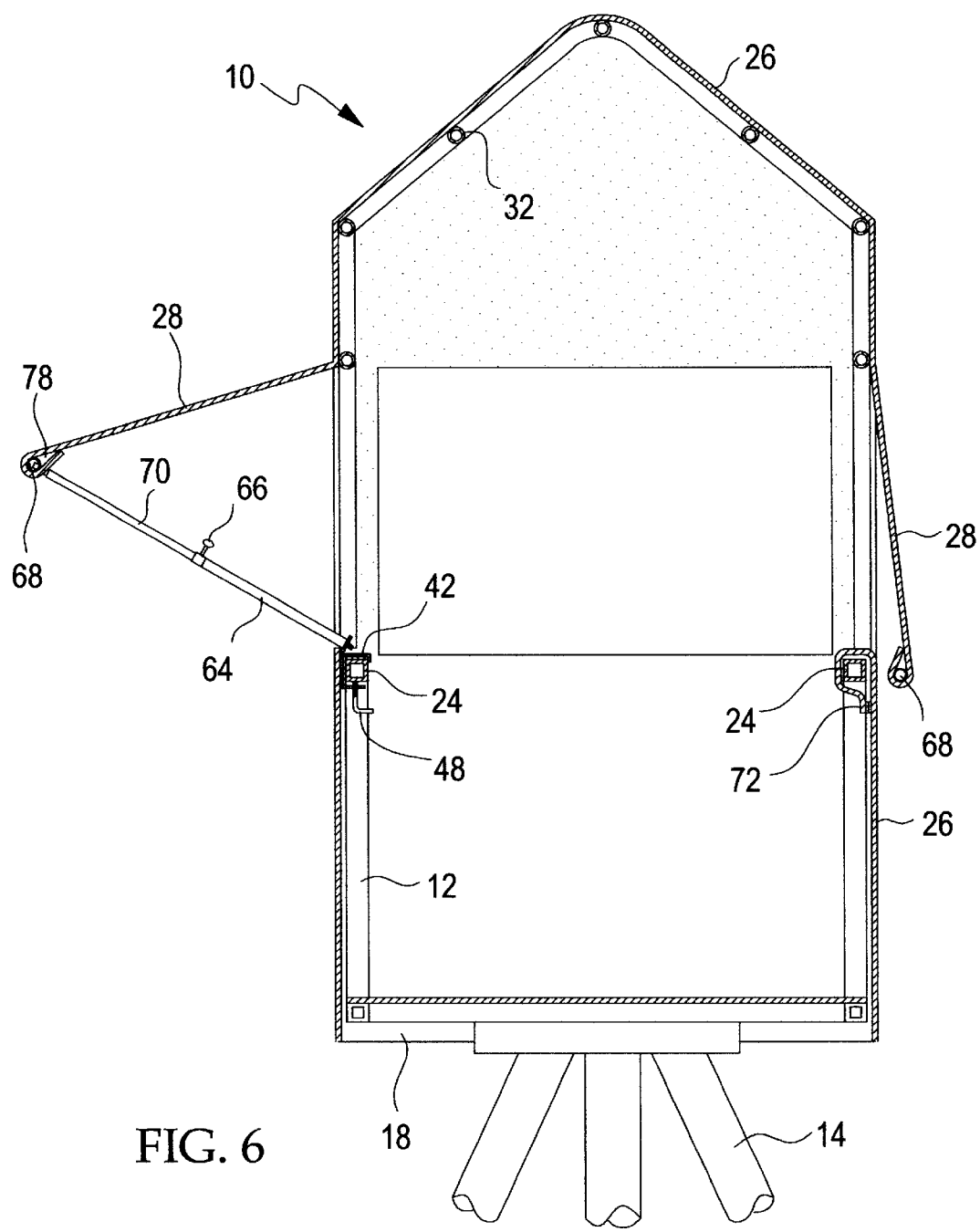
FIG. 6 is a cross-section view of the present invention taken from FIG. 1 as indicated.

Turning to FIG. 6, therein is shown the existing frame handrail 24 of the existing hunting stand 12 having the present invention 10 attached thereto as previously described. Also shown are the tripod legs 14 of the present invention along with the floor 18. Also shown is the fabric cover 26 having windows 28 therein being held open by adjustable, telescoping rods 64 having means for adjustment or telescoping adjustment 66 thereon. Connecting means 42 is shown which has been previously described in FIG. 5. Note that the windows 28 are formed from the flexible cover 26 and form multiple window flaps having a horizontal support rod 68 therein in a sleeve 78 disposed in its lower edge to which lower edge an end of the female member 70 of the telescoping rod 64 is attached. Note that the lower portion of the cover 26 passes over the handrail 24 of the existing hunting stand and attaches using book and loop material or like means at 72. Other previously disclosed elements are also shown.

Figure 7:
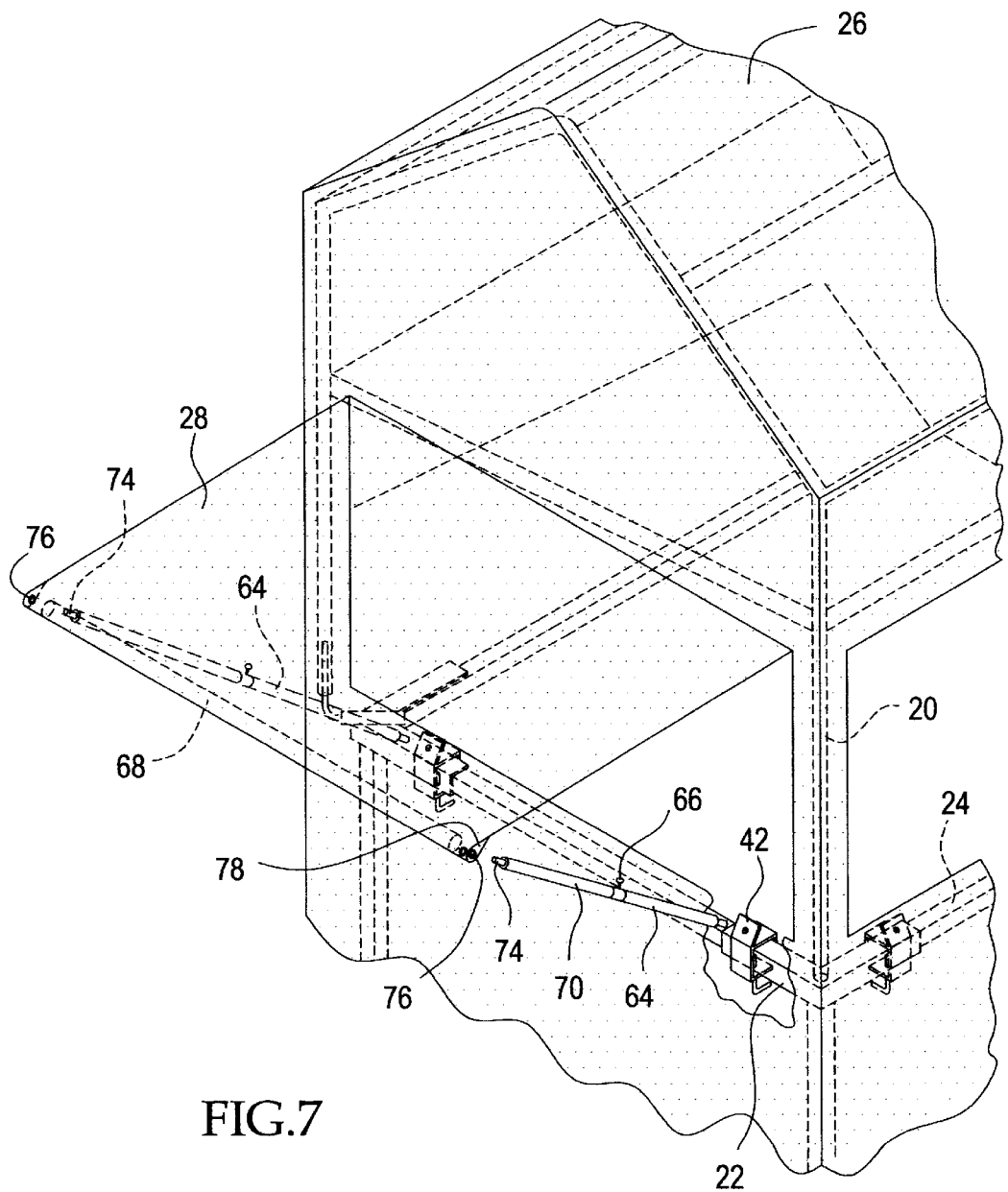
FIG. 7 is a perspective view of portions of the present invention.

Turning to FIG. 7, therein is shown a cover 26 of the present invention having a window 28 in the raised position which shows the horizontal rod 68 mounted on its lower edge having a telescoping rod 64 on each end which attaches to connecting means 42 which connects the elbow members 22 to the handrail 24 of the existing hunting stand. Rod 48 prevents window 28 from sagging on its lower or front edge. It can be seen that the telescoping rod 64 has a female member 70 having an end piece 74 thereon which goes through eyelets 76 located in the edges of the fabric window 28 in the area of the sleeve 78. The end piece 74 fits into the eyelet 76 on each end of the window so that the telescoping rod 64 can hold the window to a selectable elevation. The telescoping rods are adjustable using means 66. The tubular frame 20 of the present invention is also shown.

What is claimed to be new and desired to be protected by Letters Patent is set forth in the appended claims:

1. A hunting stand cover for removable attachment onto an existing hunting stand, the hunting stand having a floor therein and the hunting stand having a generally horizontal hand rail thereon, wherein the improvement comprises:
    a) a frame for forming an enclosure;
    b) a plurality of tubular legs formed by said frame;
    c) means for removably attaching said tubular legs to the hunting stand;
    d) a flexible cover being draped over said frame, said cover forming a partial enclosure on the hunting stand,
    e) wherein said means for removablly attaching said tubular legs to the hunting stand further comprises a plurality of elbow-shaped angle iron members for mounting onto the hand rail of the hunting stand; and
    f) a plurality of L-shaped rod members connecting said tubular legs to said elbow-shaped angle iron members, said L-shaped rod members having a first end and a second end, said first end being inserted into said tubular leg, said second end being connected to said elbow-shaped angle iron members.

2. The hunting stand cover of claim 1, wherein said frame is complementarily shaped as the existing hunting stand.

3. The hunting stand cover of claim 2, wherein said frame is generally rectangular shaped.

4. The hunting stand cover of claim 1, further comprising a tubular member fixedly attached to said first elbow-shaped angle iron member, said tubular member having an aperture therein, said aperture for receiving said second end of said L-shaped member.

5. The hunting stand cover of claim 4, further comprising means for fastening said second end of said L-shaped member to said tubular member.

6. The hunting stand cover of claim 5, wherein said second end of said L-shaped member is slidably adjustable internal said means for fastening so that said frame is adaptable to different sizes of existing hunting stands.

7. The hunting stand cover of claim 4, wherein said tubular member is fixedly attached by welding to said first elbow-shaped angle iron member.

8. The hunting stand cover of claim 6, wherein said means for fastening further comprises a threaded fastener for slidably adjusting said second end of said L-shaped member.

9. The hunting stand cover of claim 1, further comprising a plurality of clamp-like connecting means for attaching said elbow-shaped angle iron member to the hand rail of the hunting stand.

10. The hunting stand cover of claim 9, wherein said clamp-like connecting means partially encircles said elbow-shaped angle iron member and the hand rail of the hunting stand, said elbow-shaped angle iron member being sandwiched in between said clamp-like connecting means and the hand rail of the hunting stands.

11. The hunting stand cover of claim 10, further comprising a fastener for attaching said clamp-like connecting means to the hand rail of the hunting stand.

12. The hunting stand cover of claim 11, wherein said flexible cover has a plurality of windows therein, said windows forming a flexible window flap, said window flap formed from said cover, said window flap having a lower edge formed thereon.

13. The hunting stand cover of claim 12, further comprising a horizontal rod disposed in said window flap.

14. The hunting stand cover of claim 13, said window flap having a sleeve formed therein, said sleeve disposed on said lower edge of said window flap, said sleeve for receiving said horizontal rod.

15. The hunting stand cover of claim 14, further comprising a pair of telescoping rods disposed on each end of said window flap, said telescoping rod having a first end and a second end, said first end of said telescoping rod connected to each end of said window flap, and said second end of said telescoping rod connected to said clamp-like connecting means so that said window flap can be stabilizedly held in an open position.

* * * * *